US008208065B2

(12) United States Patent
Sharlet et al.

(10) Patent No.: US 8,208,065 B2
(45) Date of Patent: Jun. 26, 2012

(54) METHOD, APPARATUS, AND COMPUTER SOFTWARE FOR DIGITAL VIDEO SCAN RATE CONVERSIONS WITH MINIMIZATION OF ARTIFACTS

(75) Inventors: Dillon Sharlet, Albuquerque, NM (US); Lance Maurer, Albuquerque, NM (US)

(73) Assignee: Cinnafilm, Inc., Albuquerque, NM (US)

( * ) Notice: Subject to any disclaimer, the term of this patent is extended or adjusted under 35 U.S.C. 154(b) by 621 days.

(21) Appl. No.: 12/413,146

(22) Filed: Mar. 27, 2009

(65) Prior Publication Data

US 2010/0026886 A1 Feb. 4, 2010

Related U.S. Application Data

(60) Provisional application No. 61/141,304, filed on Dec. 30, 2008, provisional application No. 61/084,828, filed on Jul. 30, 2008.

(51) Int. Cl.
*H04N 7/01* (2006.01)
(52) U.S. Cl. ........ 348/441; 348/445; 348/700; 348/448; 348/446; 348/459
(58) Field of Classification Search .................. 348/441, 348/445, 446, 448, 451, 452, 911, 459, 699, 348/700, 701; 375/240.16, 240.01
See application file for complete search history.

(56) References Cited

U.S. PATENT DOCUMENTS

| | | | |
|---|---|---|---|
| 5,276,513 A | 1/1994 | van der Wal et al. |
| 5,500,685 A | 3/1996 | Kokaram |
| 5,600,731 A | 2/1997 | Sezan et al. |
| 5,696,848 A | 12/1997 | Patti et al. |
| 5,742,710 A | 4/1998 | Hsu et al. |
| 6,268,863 B1 | 7/2001 | Rioux |
| 6,363,117 B1 | 3/2002 | Kok |
| 6,868,190 B1 | 3/2005 | Morton |
| 7,420,618 B2 * | 9/2008 | Swartz ..................... 348/554 |
| 7,813,570 B2 | 10/2010 | Shen et al. |
| 2001/0000779 A1 | 5/2001 | Hayama et al. |
| 2001/0030709 A1 | 10/2001 | Tarnoff et al. |
| 2003/0169820 A1 | 9/2003 | Babonneau et al. |
| 2003/0202607 A1 | 10/2003 | Srinivasan |
| 2003/0206242 A1 | 11/2003 | Choi |
| 2004/0001705 A1 | 1/2004 | Soupliotis et al. |
| 2004/0008904 A1 | 1/2004 | Lin et al. |
| 2004/0012673 A1 | 1/2004 | Tanase et al. |
| 2004/0095511 A1 | 5/2004 | Amara et al. |
| 2004/0105029 A1 | 6/2004 | Law et al. |
| 2004/0135924 A1 | 7/2004 | Conklin |
| 2004/0170330 A1 | 9/2004 | Fogg |
| 2004/0179602 A1 | 9/2004 | Le Meur et al. |
| 2004/0213349 A1 | 10/2004 | Zador et al. |
| 2005/0024532 A1 | 2/2005 | Choi |
| 2005/0078176 A1 | 4/2005 | Yuan et al. |
| 2005/0089196 A1 | 4/2005 | Gu et al. |
| 2005/0168463 A1 | 8/2005 | Sepulveda |
| 2005/0179775 A1 | 8/2005 | Rodriguez et al. |
| 2005/0276323 A1 | 12/2005 | Martemyanov et al. |
| 2006/0056724 A1 | 3/2006 | Le Dinh et al. |
| 2006/0072037 A1 | 4/2006 | Wyman |
| 2006/0109899 A1 | 5/2006 | Kablotsky |
| 2006/0193526 A1 | 8/2006 | Boyce et al. |
| 2006/0215115 A1 | 9/2006 | Long et al. |
| 2006/0232712 A1 | 10/2006 | Zhou et al. |
| 2006/0267539 A1 | 11/2006 | Kuramoto |
| 2006/0290821 A1 | 12/2006 | Soupliotis et al. |
| 2007/0003156 A1 | 1/2007 | Lin et al. |
| 2007/0019114 A1 * | 1/2007 | de Garrido et al. ........... 348/701 |
| 2007/0024703 A1 | 2/2007 | Conklin |
| 2007/0035621 A1 | 2/2007 | Shimizu et al. |
| 2007/0047647 A1 | 3/2007 | Lee et al. |
| 2007/0058716 A1 | 3/2007 | Blum |
| 2007/0070250 A1 | 3/2007 | Zhou et al. |
| 2007/0071344 A1 | 3/2007 | Ouzilevski et al. |
| 2007/0097259 A1 | 5/2007 | MacInnis et al. |
| 2007/0104273 A1 | 5/2007 | Jia et al. |
| 2007/0115298 A1 | 5/2007 | Credelle et al. |
| 2007/0171280 A1 | 7/2007 | Tian et al. |
| 2007/0189635 A1 | 8/2007 | Borsdorf et al. |
| 2007/0206117 A1 | 9/2007 | Tian et al. |
| 2007/0229704 A1 | 10/2007 | Mohapatra et al. |
| 2007/0247546 A1 | 10/2007 | Lim et al. |
| 2007/0247547 A1 | 10/2007 | Liu et al. |
| 2008/0055477 A1 | 3/2008 | Wu et al. |
| 2008/0123740 A1 | 5/2008 | Ye |
| 2008/0232665 A1 | 9/2008 | Borsdorf |
| 2008/0309680 A1 | 12/2008 | Lin |
| 2008/0310509 A1 | 12/2008 | Goel |
| 2008/0317132 A1 | 12/2008 | Zhou et al. |
| 2009/0034620 A1 | 2/2009 | Okumura et al. |
| 2009/0051679 A1 | 2/2009 | Robinson |
| 2009/0052743 A1 | 2/2009 | Techmer |
| 2009/0067504 A1 | 3/2009 | Zheludkov et al. |
| 2009/0067505 A1 | 3/2009 | Tourapis et al. |
| 2009/0080515 A1 | 3/2009 | Nagaraj et al. |
| 2009/0080527 A1 | 3/2009 | Zhao et al. |

FOREIGN PATENT DOCUMENTS

JP   2005191890   7/2005

OTHER PUBLICATIONS

Bellers, E. B. et al., "Analysis of sub-pixel Motion Estimation", *Philips Research Laboratories, Television Systems Group*, 1999.
Donoho, David L. et al., "Ideal Spatial Adaptation by Wavelet Shrinkage", *Biometrika*, vol. 81, No. 3 1994 , 425-455.
Kokaram, Aivil C. , "Motion Picture Restoration", *A dissertation submitted to teh Universit of Cambridge, Department of Engineering* May 1993.
Mazare, Sebastien et al., "Using GPU for Fast Block-Matching", *XIV European Signal Processing Conference*, Florence, Italy Aug. 2006.
Starck, J L. et al., "The Undecimated Wavelet Decomposition and its Reconstruction", *Draft paper* Jun. 2, 2006.
Starck, J L. et al., "The Undecimated Wavelet Decomposition and its Reconstruction", IP(16), No. 2, *IEEE DOI Link 0702* Feb. 2007 , 297-309.

* cited by examiner

*Primary Examiner* — Jefferey Harold
*Assistant Examiner* — Jean W Desir
(74) *Attorney, Agent, or Firm* — Peacock Myers, P.C.; Jeffrey D. Myers

(57) ABSTRACT

A video format conversion method and concomitant computer software stored on a computer-readable medium comprising receiving a video stream comprising a plurality of frames in a first format, converting the video stream to a second format in approximately real time, and outputting the video stream in the second format, and wherein the converting step employs a hierarchical block true motion estimator.

16 Claims, No Drawings

METHOD, APPARATUS, AND COMPUTER SOFTWARE FOR DIGITAL VIDEO SCAN RATE CONVERSIONS WITH MINIMIZATION OF ARTIFACTS

CROSS-REFERENCE TO RELATED APPLICATIONS

This application claims priority to and the benefit of the filing of U.S. Provisional Patent Application Ser. No. 61/141,304, entitled "Methods and Applications of Forward and Reverse Motion Compensation Vector Solutions for Moving Images Including: Degrain/Denoise Solutions and Advanced Superresolution", filed on Dec. 30, 2008, and of U.S. Provisional Patent Application Ser. No. 61/084,828, entitled "Method and Apparatus for Real-Time Digital Video Scan Rate Conversions, Minimization of Artifacts, and Celluloid Grain Simulations", filed on Jul. 30, 2008, and the specifications and claims thereof are incorporated herein by reference.

A related application entitled "Method, Apparatus, and Computer Software for Modifying Moving Images via Motion Compensation Vectors, Degrain/Denoise, and Superresolution" is being filed concurrently herewith, to the same Applicants, and the specification and claims thereof are incorporated herein by reference.

This application is also related to U.S. patent application Ser. No. 12/001,265, entitled "Real-Time Film Effects Processing for Digital Video", filed on Dec. 11, 2007, U.S. Provisional Patent Application Ser. No. 60/869,516, entitled "Cinnafilm: A Real-Time Film Effects Processing Solution for Digital Video", filed on Dec. 11, 2006, and U.S. Provisional Patent Application Ser. No. 60/912,093, entitled "Advanced Deinterlacing and Framerate Re-Sampling Using True Motion Estimation Vector Fields", filed on Apr. 16, 2007, and the specifications thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

©2007-2009 Cinnafilm, Inc. A portion of the disclosure of this patent document and of the related applications listed above contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates to methods, apparatuses, and software for converting video between formats.

2. Description of Related Art

Note that the following discussion may refer to publications as to which, due to recent publication dates, are not to be considered as prior art vis-a-vis the present invention. Discussion of such publications herein is given for more complete background and is not to be construed as an admission that such publications are prior art for patentability determination purposes.

The need and desire to make convert video between formats, particularly that converted from stock footage on traditional film, is a considerable challenge due to high transfer costs and limitations of available technologies that are not only time consuming, but provide poor results.

The present invention has approached the problem in unique ways, resulting in the creation of a method, apparatus, and software that not only converts between formats, but performs this operation in real-time or near real-time without introducing many known types of artifacts from existing technologies. The invention (occasionally referred to as Cinnafilm®) streamlines current production processes for professional producers, editors, and filmmakers who use digital video to create their media projects. The invention permits conversion of old film stock to digital formats without the need for long rendering times and extensive operator intervention associated with current technologies.

BRIEF SUMMARY OF THE INVENTION

The present invention is of a video format conversion method and concomitant computer software stored on a computer-readable medium comprising: receiving a video stream comprising a plurality of frames in a first format; converting the video stream to a second format in approximately real time; and outputting the video stream in the second format; and wherein the converting step employs a hierarchical block true motion estimator. In the preferred embodiment, converting comprises employing an automatic inverse telecine technique comprising computing the sum of the squared differences or sum of the absolute differences of a field in a five-frame sequence with a field in the previous frame, and testing for presence of a telecine pattern in the video stream using the sum. Converting is performed on a graphical processing unit, computing scores by examining pixels in a block of the video stream at point x in a first image and pixels in a block of the video stream at point x+v in a second image for a candidate vector v, and selecting a vector corresponding to a minimum score. The converting produces candidate vector sets for the pixels, optimizes the sets, and stores the result in a motion map. A previous motion map is employed to reduce sizes of the candidate vector sets of subsequent images. Vector field quality is improved by displacing motion vector fields rather than by sampling along inverse directions of motion vectors. Neither conceal nor reveal artifacts are introduced by the displacing.

Objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

Not Applicable.

DETAILED DESCRIPTION OF THE INVENTION

Embodiments of the present invention relate to methods, apparatuses, and software to convert video from a first format to a second format, preferably in real time (processing speed equal to or greater than ~30 frames per second). Accordingly, with the invention processed digital video can be viewed "live" as the source video is fed in. So, for example, the invention is useful with video "streamed" from the Internet, as well as in converting motion pictures stored on physical film.

Although the invention can be implemented on a variety of computer hardware/software platforms, including software stored in a computer-readable medium, one embodiment of hardware according to the invention is a stand-alone device, which is next described. Internal Video Processing Hardware preferably comprises a general purpose CPU (Pentium4®, Core2 Duo®, Core2 Quad® class), graphics card (DX9 PS3.0 or better capable), system board with expandability for video I/O cards (preferably PCI compatible), system memory, power supply, and hard drive. A Front Panel User Interface preferably comprises a standard keyboard and mouse usable menu for access to image-modification features of the invention, along with three dials to assist in the fine tuning of the input levels. The menu is most preferably displayed on a standard video monitor. With the menu, the user can access at least some features and more preferably the entire set of features at any time, and can adjust subsets of those features. The invention can also or alternatively be implemented with a panel display that includes a touchscreen.

The apparatus of the invention is preferably built into a sturdy, thermally proficient mechanical chassis, and conforms to common industry rack-mount standards. The apparatus preferably has two sturdy handles for ease of installation. I/O ports are preferably located in the front of the device on opposite ends. Power on/off is preferably located in the front of the device, in addition to all user interfaces and removable storage devices (e.g., DVD drives, CD-ROM drives, USB inputs, Firewire inputs, and the like). The power cord preferably extrudes from the unit in the rear. An Ethernet port is preferably located anywhere on the box for convenience, but hidden using a removable panel. The box is preferably anodized black wherever possible, and constructed in such a manner as to cool itself via convection only. The apparatus of the invention is preferably locked down and secured to prevent tampering.

An apparatus according to a non-limiting embodiment of the invention takes in a digital video/audio stream on an input port (preferably SDI, or from a video data file or files, and optionally uses a digital video compression-decompression software module (CODEC) to decompress video frames and the audio buffers to separate paths (channels). The video is preferably decompressed to a two dimensional (2D) array of pixel interleaved luminance-chrominance (YCbCr) data in either 4:4:4 or 4:2:2 sampling, or, optionally, red, green, and blue color components (RGB image, 8-bits per component). Due to texture resource alignment requirements for some graphics cards, the RGB image is optionally converted to a red, green, blue, and alpha component (RGBA, 8-bits per component) buffer. The audio and video is then processed by a sequence of operations, and then can be output to a second output port (SDI) or video data file or files.

Although other computer platforms can be used, one embodiment of the present invention preferably utilizes commodity x86 platform hardware, high end graphics hardware, and highly pipelined, buffered, and optimized software to achieve the process in realtime (or near realtime with advanced processing). This configuration is highly reconfigurable, can rapidly adopt new video standards, and leverages the rapid advances occurring in the graphics hardware industry.

In an embodiment of the present invention, the video processing methods can work with any uncompressed video frame (YCbCr or RGB 2D array) that is interlaced or non-interlaced and at any frame rate, including 50 or 60 fields per second interlaced (50 i, 60 i), 25 or 30 frames per second progressive (25 p, 30 p), and 24 frames per second progressive, optionally encoded in the 2:3 pulldown or 2:3:3:2 pulldown formats. In addition to DV, there are numerous CODECs that exist to convert compressed video to uncompressed YCbCr or RGB 2D array frames. This embodiment of the present invention will work with any of these CODECs.

The present invention employs one or more of several techniques to permit rapid and artifact-free conversion between video formats, as described below.

First, the invention provides an automatic inverse telecine method and software. The objective of inverse telecine is to take a series of frames which was created by sometimes repeating fields to turn 4 progressive frames into 5 interlaced frames, and turn it back into the original 4 frame sequence. Some possible patterns are outlined below:

| Original 4 frame sequence: | | | |
|---|---|---|---|
| $F_0$ | $F_1$ | $F_2$ | $F_3$ |
| $A_0A_1$ | $B_0B_1$ | $C_0C_1$ | $D_0D_1$ |

| $F_0$ | $F_1$ | $F_2$ | $F_3$ | $F_4$ |
|---|---|---|---|---|
| New 5 frame sequence: 2:3 pattern: | | | | |
| $A_0A_1$ | $B_0B_1$ | $B_0C_1$ | $C_0D_1$ | $D_0D_1$ |
| 2:3:3:2 pattern | | | | |
| $A_0A_1$ | $B_0B_1$ | $B_0C_1$ | $C_0C_1$ | $D_0D_1$ |
| Duplicate frame pattern: | | | | |
| $A_0A_1$ | $B_0B_1$ | $C_0C_1$ | $D_0D_1$ | $D_0D_1$ |

The two letters from each frame represent a field. The fields can be presented in the order needed by the video device.

The first step of the method is to compute the sum of the squared differences (SSD) or sum of the absolute differences (SAD) of a field in the 5 frame sequence with the field in the previous frame. These 10 values are stored on the later field of the field pair. A subset of the lines in a field can be used to compute the SSD or SAD to reduce processing power required. For example, frame F1 of the duplicate frame pattern would store the SSD between fields $(A_0, B_0)$ and $(A_1, B_1)$. For the first frame of the sequence, the last set of fields in the previous sequence of 5 frames is used as the previous field.

The next step is to find the minimal SSD/SAD value for the set of field 0 and the set of field 1. For example, in the 2:3 pattern the pair $(B_0, B_0)$ from frame 2 and the pair $(D_1, D_1)$ from frame 4 will have the minimal SSD/SAD values since they are the same field duplicated.

Once the fields with the minimal SSD/SAD values are located, these fields are dropped from the sequence. Continuing with the above example, the sequence would now look like this (X is a dropped field):

| $F_0$ | $F_1$ | $F_2$ | $F_3$ | $F_4$ |
|---|---|---|---|---|
| $A_0A_1$ | $B_0B_1$ | $XC_1$ | $C_0D_1$ | $D_0X$ |

More clearly illustrated with separate sequences of fields:

$A_0 \; B_0 \; X \; C_0 \; D_0$ $A_1 \; B_1 \; C_1 \; D_1 \; X$

The holes in the pattern are then filled by removing the dropped fields and shifting the pattern down to 4 fields:

$A_0 \; B_0 \; C_0 \; D_0$ $A_1 \; B_1 \; C_1 \; D_1$

This is the reconstructed original 4 frame sequence.

There is another possible case that needs to be handled. Suppose the beginning of the pattern was at a frame 3 of the 2:3 pattern:

| $F_3$ | $F_4$ | $F_0$ | $F_1$ | $F_2$ |
|---|---|---|---|---|
| $A_0B_1$ | $B_0B_1$ | $C_0C_1$ | $D_0D_1$ | $D_0E_1$ |

Dropping the duplicate fields (minimal SSD/SAD value):

| $F_3$ | $F_4$ | $F_0$ | $F_1$ | $F_2$ |
|---|---|---|---|---|
| $A_0B_1$ | $B_0X$ | $C_0C_1$ | $D_0D_1$ | $XE_1$ |

Reconstructing the 4 frame sequence:

$A_0 \; B_0 C_0 \; D_0 \; X$ $B_1 \; X \; C_1 \; D_1 \; E_1$ $A_0 \; B_0 C_0 \; D_0$ $B_1 \; C_1 \; D_1 \; E_1$

Clearly this is an incorrect sequence. This case is detected by examining the new frames produced. In the first example, notice that the frame composed of A and B both came from the same frame in the 5 frame sequence. This is because generally telecine patterns are composed of more progressive frames than interlaced frames, and more specifically this is true of all 3 standard patterns listed above. This fact is used to detect the above error case: If the new sequence indicates that there were more interlaced frames in the original 5 frame sequence than progressive frames, this sequence is an error because a field from the first frame of the sequence is missing. The solution is to drop the first frame of the incoming 5 frame sequence since the missing field is not available and wait for the next frame to create a new 5 frame sequence using the 4 latter frames of the error sequence. This will only occur on the first sequence of an incoming stream, so frames will never be dropped from the middle of a video, and the error case will be hit a maximum of once at the beginning of a series of frames with a given telecine pattern.

The invention also provides for testing for the presence of a telecine pattern in a video stream. It is also possible to accurately test for the presence of a telecine pattern in the incoming video by examining the SSD/SAD values. The minimal values should be much smaller than the other 4 SSD/SAD values in the sequence. Let D be the sum of the 4 non-minimal SSD/SAD values, and let M be the minimal SSD/SAD value. Then as $1-M/D$ approaches 1, the likelihood of the presence of a telecine pattern approaches 1.

In tests of moving video, the confidence in the telecine pattern $1-M/D$ was 95%+ for telecined video with motion, 70-90% for telecined video without motion, and 5-10% for video that has not be telecined.

The invention also provides for an implementation of a hierarchical block True Motion Estimator (TME) on a GPU (Graphical Processing Unit). The fundamental algorithm behind all motion estimation methods is to produce a set of candidate vectors C, and an optimization algorithm is used to evaluate the set of vectors to find the best match. Keeping the size of the candidate vector set small is critical to the performance of the method. The hierarchical motion estimation scheme is a way of reducing the size of the candidate vector set.

For two images A and B, the method is as follows:

For both A and B, reduce the resolution by half repeatedly to produce lower and lower resolution images, each image is effectively a low pass filtered version of the previous image. Let $A_0$ and $B_0$ be the full resolution images, $A_1$ and $B_1$ are half resolution, $A_2$ and $B_2$ are quarter resolution and so on. The process is stopped when the resolution of $A_n$ is smaller than the size of a block. For each pair of images ($A_n$, $B_n$) there is a motion map $M_n$. The resolution of the motion map $M_n$ is the resolution of the images $A_n$ and $B_n$ divided by the size of a block. Each pixel of the motion map is made up of 3 elements: the x and y components of the motion vector, and a score, the measure of how well the vector describes the transformation between images $A_n$ and $B_n$.

The score is computed by examining the pixels in the block in image $A_n$ at a point x, compared to the block of pixels in $B_n$ at x+v for the candidate vector v. The score is computed such that as the blocks difference grows, the score grows larger. An arithmetic method such as sum of the absolute differences (SAD) or sum of squared differences (SSD) can be used here. The vector corresponding to the minimum score value is selected as the motion vector at that point.

Starting with the largest n, produce a candidate vector set C for the pixel in the motion map $M_n$ describing the motion at this pixel in the images such that x in $A_n$ is the same block of pixels as x+$c_i$ in $B_n$ where $c_i$ is the candidate vector. Optimize the candidate vector set and store the resulting vector at x in $M_n$.

For the subsequent n−1, use the previous motion map $M_n$ to produce a new candidate vector set for the block at x in images $A_n$-1 and $B_n$-1. The information from the motion map in the previous level $M_n$ is used to reduce the size of the candidate vector set in level n−1. In our implementation, we reduce the size of the candidate vector set by alternating a pattern subset of the 8 possible vectors offset from the vectors in level n−1. One pattern set is the set of compass vectors N, W, E, S, and the other set is NW, NE, SW, SE.

In addition to candidate vectors from the current motion map $M_n$, candidates may also be selected from temporally close motion vector fields.

After the potential set of candidate vectors is evaluated for all pixels in the motion map Mn, optionally a number of refinement iterations are processed. Each refinement iteration involves minimizing the candidate vector set consisting of the current vector itself at x in $M_n$, as well as the vectors at point x+(1, 0), x+(0, 1), x+(−1, 0), x+(0, −1) in $M_n$. When computing the score of these neighboring vectors, a small bias is applied to encourage the optimization algorithm to select a neighboring vector, resulting in smoother vector fields. Optionally, adding combinations of the previously mentioned neighbor vectors to the candidate set can produce better vector fields for motion that varies smoothly in position.

The method presented here is particularly well suited for implementation on a GPU.

The invention also provides for improving vector field quality by displacing fields by motion vectors. The invention works to displace the motion vector field or image field rather than sample along the inverse direction of the motion vector. The costs of implementing this technique without GPU hardware would be immense.

The current state of the art says that given a motion vector v(x) describing the motion at point x for fields A and B, if one wants to sample the field temporally half way between A and B at a point x, one should using A(x−v(x))*0.5). This idea is fundamentally flawed. Imagine two fields picturing a stationary background with a moving block which has a width of 2 units, and travels 4 units. The object has moved over the point half way between the two locations, without ever being pictured there in either field. Therefore, the correct motion vector at a point x in this region that was jumped over is 0 since the background is stationary. Attempting to sample the field at x using the above method will result in an incorrect sample of A(x−0*0.5)=A(x), which is the background, yet the object has passed through this point half way between the two fields.

A solution to this problem is to either displace either the motion vector field or the image field by the motion vector, instead of performing a reverse lookup. Displacing the motion vector field is done for performance reasons since the motion vector field is typically 1/16th to 1/64th as many points.

An example implementation of this idea on the GPU is as follows. To generate the motion vector field at half way between two fields A and B (t=0.5), create a 2D grid of vertices connected by edges to create triangles. Each vertex corresponds to one pixel in the motion map M. Using the vertex shading facilities of the graphics card, the 'color' of the geometry is assigned to be the motion vector, and then the vertex is moved in the direction of the motion vector at the corresponding pixel in M, scaled by t.

Clearly running on a GPU is highly conducive to this method. A huge library features such as triangle setup, rasterization, depth ordering (z buffering), vertex transformations, and texture sampling is taken advantage of.

Revisiting the example problem before, now the motion vector field has been displaced, so the vector at the point x half way between the two sampled locations in fields A and B correctly contains the motion vector of 4 units, and thus the correct location in the field is sampled from the same reverse lookup equation given above.

If the technique is applied to the image field, no reverse lookup is necessary because the color information has already been displaced by the process of displacing the field by the motion vectors.

The invention also preferably provides for correcting 'conceal' artifacts with the motion vector displacement method. A conceal artifact occurs when a pixel in one field A cannot be found in the subsequent field B because it becomes hidden by another object in the scene. Improperly handling concealed regions results in artifacts on the edges of moving objects.

Given correct motion vectors and the motion vector displacement system described above, one can then solve reveal artifacts using the z buffering hardware present on a GPU. A reveal artifact is identified by examining the motion vector v at a point x, and the motion vector v' at the subsequent motion vector field at the point x+v. Generally for a continuously moving object, the vectors v and v' will be very similar, and the differences can be explained by small values caused by acceleration and deceleration of the object.

However, large abrupt changes are present when the pixel of the current moving object is hidden in a subsequent frame. This motion vector will now represent the motion of a different object in the scene.

Therefore, assigning the depth (z-value) of a pixel to be proportional to the length of the difference vector v−v' will cause concealed pixels to be hidden by the z buffering hardware of the GPU, and replaced by the object that moved over the concealed pixels.

The invention also provides for correcting 'reveal' artifacts with the motion vector displacement method. A reveal artifact occurs when a pixel in a field B was not present in the previous field A because it was previously hidden by another object in the scene. Improperly handling revealed pixels results in artifacts in the regions that were revealed.

Given correct motion vectors and the motion vector displacement described above, it is also straightforward to identify regions that are revealed. In the motion vector displacement system, revealing occurs when motion vectors pull the grid of points apart, resulting in a hole in the triangle mesh. Therefore, reveal artifacts can be solved by some method of detecting stretching in the triangle mesh, or other method of filling the hole left by a revealed region.

If a hole is detected in the triangle mesh, the pixels from this region must be selected from field B, using the subsequent motion vector field for displacement.

In our GPU implementation, the pixel shader instructions ddx and ddy are used to detect stretching in the triangle mesh by measuring the rate of change of a variable that should linearly go from 0 to 1 as the triangle mesh is traversed. When stretching is detected, the motion vector at that point is replaced with the motion vector from the subsequent field. Additionally, the w=1 component of mv indicates the motion vector is being revealed and as such should select field B, otherwise select field A since mv.w was assigned the value 0 in 7.

The invention also provides for measuring the visual acceptability of motion vectors. Since errors in the motion vector data can result in very harsh artifacts in the video, a robust fallback system must be implemented to detect the failure of the motion estimation method and replace it with a different field interpolation algorithm. A logical start for approaching this is using the score values produced by the motion estimation algorithm corresponding to the optimized vectors.

However, in practice this method results in a very high frequency alternating between good scoring vectors and bad scoring vectors, which results in harsh artifacts from alternating between motion compensated field generation and non-motion compensated fields. The method presented here is to use the motion estimator score values from low pass filtered levels of the image pyramid, which provides a result more in line with human perception.

This method is preferably built in to the implementation of the motion estimator of the invention. The motion estimation step at each level parametrically weights the average of the previous level's scores with the current level's actual score. At an optionally determined level, the motion estimator begins assigning the average of the previous level to the score value instead of the actual vector score. This results in a smooth score field which results in a much more visually acceptable transition to a non-motion compensated algorithm for interpolating fields.

The invention also provides for selecting the color space to perform motion estimation. There are many color spaces in which video data can reside, and some of these different color spaces may offer better performance for motion estimation for different kinds of video. For example, suppose an object travels across the screen but also changes color. Using the RGB color space to perform motion estimation may result in bad vectors because the object changing color is incorrectly perceived to be object motion. However, a color space in which color is ignored will not see the color changes, and be able to follow the object motion correctly. An example of a color space like this is the luminance channel only.

Now suppose an object is undergoing changes in brightness, but remains static in color. The motion estimator may incorrectly perceive the changes in brightness as motion, but performing the motion estimation in a color space which ignores brightness would ignore these changes in brightness while following the object in color. Using a hue channel only is an example of a color space with these properties.

The option to choose the color space in which motion estimation is performed offers a powerful tool to the user to potentially get an increase in motion vector field quality.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A video format conversion method comprising the steps of:
   receiving a video stream comprising a plurality of frames in a first format;
   converting the video stream to a second format in approximately real time; and
   outputting the video stream in the second format; and
   wherein the converting step employs a hierarchical block true motion estimator performed on a graphical processing unit and computing scores by examining pixels in a block of the video stream at point x in a first image and pixels in a block of the video stream at point x+v in a second image for a candidate vector v, and selecting a vector corresponding to a minimum score.

2. The method of claim 1 wherein converting comprises employing an automatic inverse telecine technique comprising computing the sum of the squared differences or sum of the absolute differences of a field in a five-frame sequence with a field in the previous frame.

3. The method of claim 2 wherein the converting step comprises testing for presence of a telecine pattern in the video stream using the sum.

4. The method of claim 1 wherein the converting step produces candidate vector sets for the pixels, optimizes the sets, and stores the result in a motion map.

5. The method of claim 4 wherein a previous motion map is employed to reduce sizes of the candidate vector sets of subsequent images.

6. The method of claim 1 wherein vector field quality is improved by displacing motion vector fields rather than by sampling along inverse directions of motion vectors.

7. The method of claim 6 wherein conceal artifacts are not introduced by the displacing.

8. The method of claim 6 wherein reveal artifacts are not introduced by the displacing.

9. Computer software stored on a non-transitory computer-readable medium for converting a video stream from a first format to a second format, said software comprising:
   software accessing an input buffer into which at least a portion of said video stream is at least temporarily stored; and
   software converting said video stream from the first format to the second format in approximately real time; and
   wherein said converting software comprises a hierarchical block true motion estimator operating on a graphical processing unit and computing scores by examining pixels in a block of the video stream at point x in a first image and pixels in a block of the video stream at point x+v in a second image for a candidate vector v, and selecting a vector corresponding to a minimum score.

10. The software of claim 9 wherein said converting software comprises employing automatic inverse telecine software comprising computing the sum of the squared differences or sum of the absolute differences of a field in a five-frame sequence with a field in the previous frame.

11. The software of claim 10 wherein said converting software comprises software testing for presence of a telecine pattern in the video stream using the sum.

12. The software of claim 9 wherein said converting software produces candidate vector sets for the pixels, optimizes the sets, and stores the result in a motion map.

13. The software of claim 12 wherein said converting software employs a previous motion map to reduce sizes of the candidate vector sets of subsequent images.

14. The software of claim 9 wherein vector field quality is improved by software displacing motion vector fields rather than sampling along inverse directions of motion vectors.

15. The software of claim 14 wherein conceal artifacts are not introduced by said displacing software.

16. The software of claim 14 wherein reveal artifacts are not introduced by said displacing software.

* * * * *